(12) United States Patent
Park

(10) Patent No.: US 9,025,072 B2
(45) Date of Patent: May 5, 2015

(54) CAMERA MODULE AND METHOD FOR ADJUSTING FOCUS OF LENS IN CAMERA MODULE

(75) Inventor: Kyongnam Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 79 days.

(21) Appl. No.: 12/899,907

(22) Filed: Oct. 7, 2010

(65) Prior Publication Data

US 2011/0085073 A1 Apr. 14, 2011

(30) Foreign Application Priority Data

Oct. 7, 2009 (KR) .................. 10-2009-0095297

(51) Int. Cl.
| | |
|---|---|
| *H04N 9/64* | (2006.01) |
| *G03B 13/00* | (2006.01) |
| *H04N 5/225* | (2006.01) |
| *H04N 5/232* | (2006.01) |

(52) U.S. Cl.
CPC .............. *G03B 13/00* (2013.01); *H04N 5/2257* (2013.01); *H04N 5/23212* (2013.01)

(58) Field of Classification Search
CPC .................................................. H04N 5/23212
USPC ............................................. 348/349, 333.11
See application file for complete search history.

(56) References Cited

U.S. PATENT DOCUMENTS

| | | | | |
|---|---|---|---|---|
| 2004/0012682 | A1* | 1/2004 | Kosaka et al. | 348/207.99 |
| 2005/0088546 | A1* | 4/2005 | Wang | 348/239 |
| 2007/0047941 | A1* | 3/2007 | Iwane et al. | 396/123 |
| 2007/0092238 | A1* | 4/2007 | Shirakata | 396/72 |
| 2008/0273755 | A1* | 11/2008 | Hildreth | 382/103 |
| 2009/0125843 | A1* | 5/2009 | Billmaier et al. | 715/835 |
| 2009/0303176 | A1* | 12/2009 | Chen et al. | 345/156 |
| 2010/0013943 | A1* | 1/2010 | Thorn | 348/222.1 |

* cited by examiner

*Primary Examiner* — Roberto Velez
*Assistant Examiner* — Cynthia Segura
(74) *Attorney, Agent, or Firm* — Saliwanchik, Lloyd & Eisenschenk

(57) ABSTRACT

Disclosed herein is a camera module having a selective focus adjustment function. The camera module includes a lens part containing a multiple of lenses, an image sensor converting an optical image transmitted through the lens part into an electric signal, and a main control part transferring the lens part driving signal to set a focusing area around the finger end part indicated by a finger in an image obtained from the optical image in a preview state. According to the proposed invention, a focusing region is set around the end part of a finger at the time of capturing an image when a user indicates a desired focusing setting area by a finger, so that the user can take the focus by selecting a desirable focus position freely at the time of photographing an image using a portable terminal having a camera module of the present invention.

6 Claims, 5 Drawing Sheets
(4 of 5 Drawing Sheet(s) Filed in Color)

CAMERA MODULE AND METHOD FOR ADJUSTING FOCUS OF LENS IN CAMERA MODULE

CROSS-REFERENCE TO RELATED APPLICATION

This application claims the benefit under 35 U.S.C. §119 of Korean Application No. 10-2009-0095297, filed Oct. 7, 2009, which is hereby incorporated by reference in its entirety.

BACKGROUND

1. Field of the Invention

The present invention relates to a camera module, particularly to a camera module configured to adjust a lens focus in a camera module having a selective focus adjusting function, and a method thereof 2. Description of the Related Art Camera modules are mounted on a portable terminal having various camera functions such as portable telephones and PDAs (Personal Digital Assistants). The camera module receives a desired image through a photographing device, displays the input image on an image display device for presentation, stores the image as an image file by a photographing selection of a photographer, and outputs the stored image file.

Such a camera module is provided with an auto focus (AF) function for being to the point to a to-be-photographed subject for gaining a good pictorial image.

Ordinarily, as a condition of successfully performing an autofocus function, a high contrast, a high S/N ratio (hereinafter, signal to noise ratio), etc. are pointed out. In a case a contrast is humble or an S/N ratio is low, an auto focus may not be carried out properly in low brightness. Therefore, in order to enhance reliability of an auto focus in low brightness, a methodology of increasing a contrast using an IR signal (infrared signal) or maintaining an S/N ratio by keeping film speed pursuant to ISO (International Standards Organization) is employed. For a portrait focused photograph, an AF processing of recognizing the face of a subject by a picture image recognition processing and executing an auto focus to be to the point to the recognized corresponding face position recently emerges also. However, an auto focus region setting in a camera module is extremely limited unlike a DSLR (Digital Single Lens Reflex) having an auto focus region selectable by a user.

BRIEF SUMMARY

The present invention being created considering such described facts, an object of the present invention provides a camera module and a lens focus adjusting method of the camera module for taking the focus by selecting a focus setting position desired by a user.

To achieve such an object, a camera module according to the present invention includes a lens part containing a plurality of lenses; an image sensor converting an optical image transmitted by the lens part to an electric signal; and a main control part transferring the lens part driving signal to set a focusing area around the finger end part indicated by a finger in an image obtained from the optical image in a preview state.

Herein, the main control part may include: a finger region detecting part detecting a finger region in an image containing the finger in a preview state; a thinning part performing a thinning process to have a thinnest thickness enabling the detected finger region to be recognized; and a selective AF (auto focus) part outputting a signal of focusing a certain area around an end part of the thinning processed lines.

In addition, the finger region detecting part may process the finger region detected from the image into one of either black or white and a non-finger region into another color of the black and white when the finger region is detected.

In addition, the thinning part may mark the detected finger region using lines of one pixel value, so that only one pixel for each row of overall pixels has a finger recognition value.

Also, to achieve the aforementioned object, a method of adjusting a lens focus of a camera module according to the present invention includes: detecting a finger region from a finger-containing image where a focusing desired part is indicated in a preview state by a finger; performing a thinning process to have a thinnest thickness enabling the detected finger region to be recognized; and outputting a signal configured to focus a certain area around an end part of the thinning processed lines.

Herein, the method may further include processing the finger region detected from the image into one of either black or white and a non-finger region into another color of the black and white after the finger region is detected.

Also, the step of performing a thinning process may mark the detected finger region using lines of one pixel value, so that only one pixel for each row of overall pixels has a finger recognition value.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION

Figure 1:
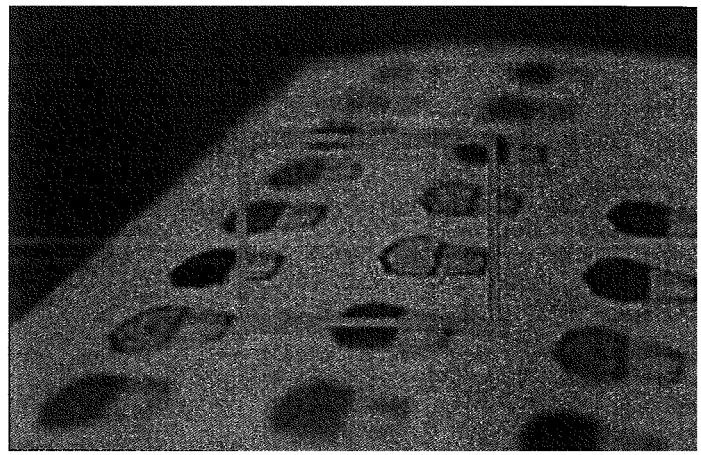
FIGS. 1 through 3 are block diagrams showing an auto focus function of a camera module.

Since the present invention can have various changes thereto and several types of embodiments, specific embodiments intends to be exemplified in the drawings and minutely described in the detailed description.

However, it should not be appreciated in a limiting sense of limiting the present invention to a specific example but to include all the changes, equivalents and replacements which fall in the spirit and technical scope of the present invention.

Stated that any first component "is connected" or "is conjunctive" to another component, it will be appreciated to be directly connected or conjunctive to the very another component or otherwise that there exists any component in the midst of them.

In the following, a preferred embodiment according to the present invention will be described in detail referring to the attached drawings, but without regard to a drawing sign, an identical or corresponding component is assigned the same reference numeral and a redundant description regarding this will be omitted.

Figure 2:
Figure 3:
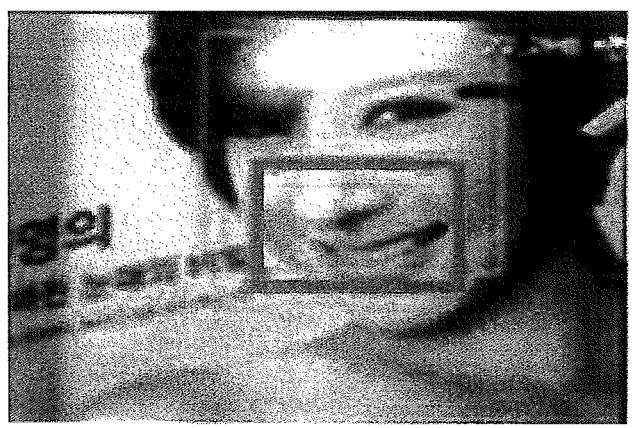

FIGS. 1 through 3 are diagrams showing an auto focus function of a camera module.

Referring to FIG. 1, the figure is a picture automatically focusing on a center part of an image, and in the auto-focusing, the surrounding part depart from an auto focus area fails to be auto-focused. To bring a surrounding part out of an auto-focus area into focusing, a photograph must be taken after placing a focusing desired subject in the centre of a camera, locking an auto focus function using a half-shutter and then shifting the camera to dispose a subject in the surrounding part. In this case, a camera shake phenomenon occurs or a dilemma where the auto focus function is released exists in the course of moving a portable terminal having a camera module with the auto focus function locked in the time of capturing an image.

FIG. 2 refers to a photograph auto-focusing a face part by recognizing the face of a person, and FIG. 3 is a photograph auto-focusing a smiling face part by recognizing a smiling aspect of a person. In these cases, there is a problem in that a face or a smiling aspect of a person is recognized, thereby only focusing the face of a person and difficult to focus other subjects besides a human face.

A camera module according to the present embodiment sets a focusing region around an end part of a finger by indicating a focusing desired area in the time of capturing an image by the finger.

FIGS. 4A through 4F are diagrams describing an auto focusing method according to an embodiment of the present invention.

Figure 4A:
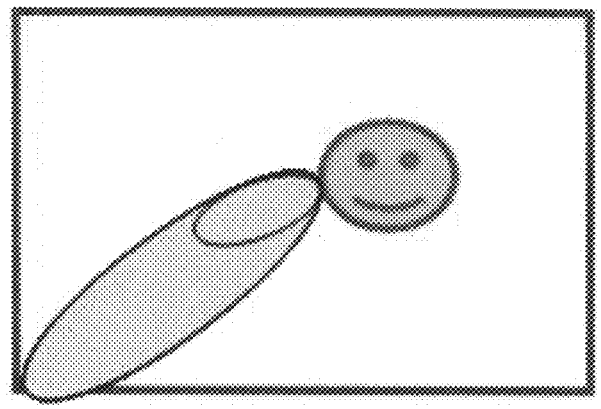
FIGS. 4A through 4F are diagrams describing an auto focus method according to an embodiment of the present invention.

Referring to FIGS. 4A through 4F, a user obtains an image from a camera module in a preview state and points out an auto focusing desired part by a finger (FIG. 4A).

Figure 4B:
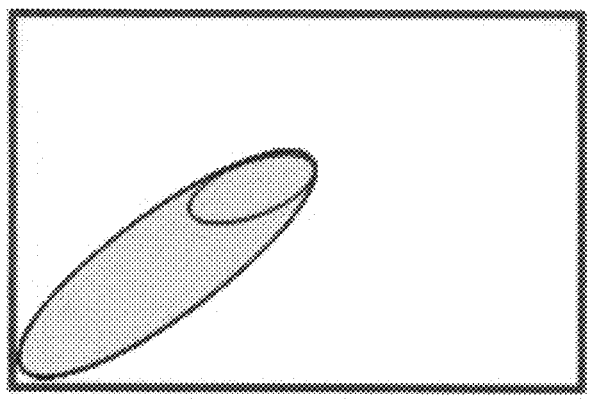

Then, the camera module detects a finger region from an image containing the finger (FIG. 4B). For example, the detection of a finger region may employ skin-color hue information of a finger. A skin color of the finger may be sampled to obtain a RGB (red, green, blue) value of the skin-color, and a skin color of a finger may be defined and databased on RGB value conditions of a sampled skin-color. Conditions of an RGB value of the sampled skin color may be presented as shown in the following Equation 1.

$$R>95 \text{ and } G>40 \text{ and } B>20 \text{ and}$$

$$\text{Max}(R,G,B)-\text{min}(R,G,B)>15 \text{ and}$$

$$|R-G|>15 \text{ and } R>G \text{ and } R>B \quad \text{Equation (1)}$$

However, Equation 1 is considered only one example of the present embodiment, and those skilled in the art will understand that it can be presented as another RGB range as well.

Figure 4C:
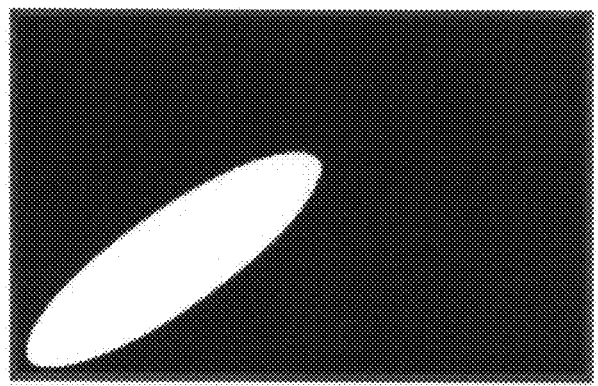

Next, a black and white processing is performed on a finger region detected from an image and a non-finger region (FIG. 4C). For example, the detected finger region is processed as a white, and the non-finger region is processed as a black color. The black/white processing may be performed as a dissension of the above example, that is, a detected finger may be processed as a black and a non-finger region may be processed, and it may be processed as a contrast of other colors that is not black/white as well.

Figure 4D:
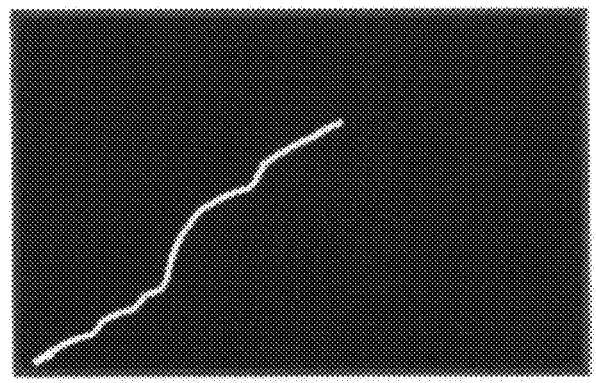

Thereafter, the detected finger region is thinning processed (FIG. 4D). Here, a thinning procedure refers to a process of stripping a surface of a targeted object to have a thinnest recognizable thickness. For example, the targeted object may be displayed as a constant line of 1 pixel value by stripping its surface. Herein, 1 pixel value means that one pixel in each row of an entire pixel has a finger recognition value. Also, a thinned line may be binary-coded as '1', and a non-line part as '0'.

Figure 4E:
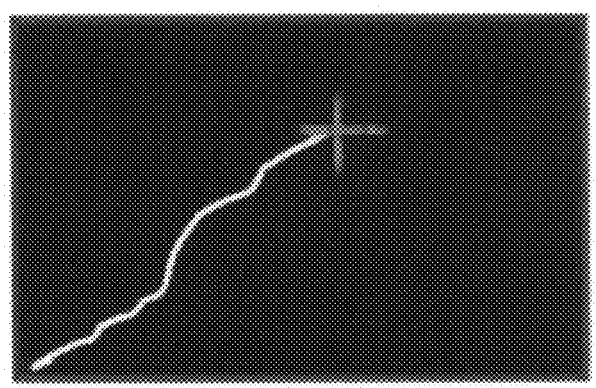
Figure 4F:
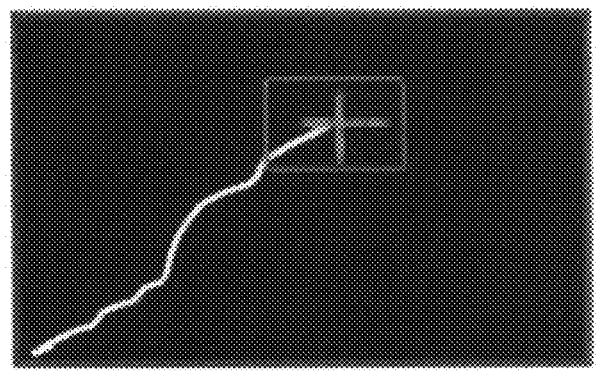

Next, an end part of a thinned line is detected (FIG. 4E). For example, an end part pixel displayed as a line of one pixel value is detected. Then, an image is captured focusing a certain area around an end part of a line (FIG. 4F). For example, an image may be captured by focusing a preset ¼ size area of the length and breadth of a portable terminal display around an end part of a line.

Figure 5:
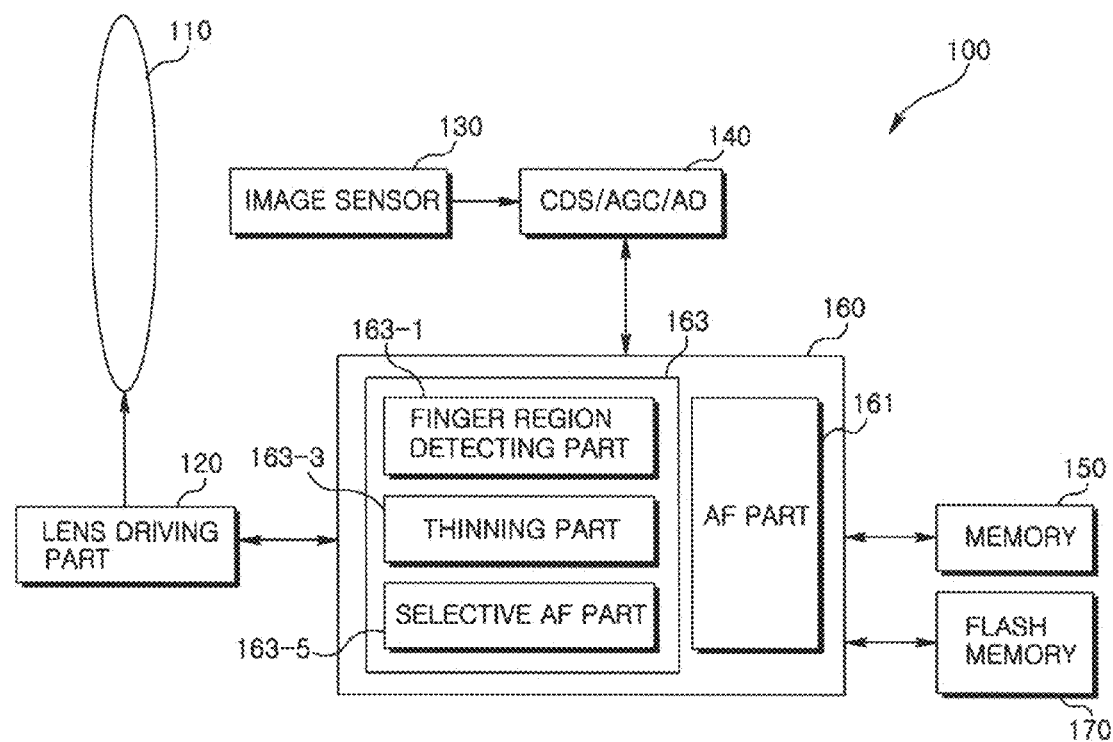
FIG. 5 is a block diagram indicating an auto focusing camera module according to an embodiment of the present invention.

FIG. 5 is a block diagram indicating an auto focusing camera module according to an embodiment of the present invention.

Referring to FIG. 5, an auto focusing camera module 100 according to the present invention includes a lens part 110, a lens driving part 120, an image sensor 130, a unit circuit 140, a memory 150, a main control part 160 and a flash memory 170.

A lens part 110 includes a multiple of lenses, possibly including a focus lens and a zoom lens, etc.

A lens driving part 120 is connected to the lens part 110 to drive a multiple of lenses towards an optical axis direction, and may include a focus motor and a zoom motor and a motor driver and a zoom motor driver for example, for having a focus lens and a zoom lens driven towards an optical axis direction according to a control signal of the main control part 160.

An image sensor 130 converts an optical image of a subject transmitted through the lens part 110 as an image photographing means and outputs it to the unit circuit 140. Here, the image sensor 130 may be a CCD (charge coupled device) image sensor or a CMOS (complementary metal-oxide semiconductor) image sensor.

A unit circuit 140 includes a CDS (Correlated Double Sampling) circuit keeping an image photographing signal output from the image sensor 130 through a correlated double sampling, an AGC (Automatic Gain Control) circuit executing an automatic gain control of the image photographed signal after that sampling, and an A/D (analog-to-digital) converter converting an analog image photographed signal into a digital signal after that automatic gain control, and the image photographed signal of the image sensor 130 may be outputted to the main control part 160 through the unit circuit 140.

The memory 150 includes a control program needed in each part of the main control part 160, and records various kinds of programs and a necessary data.

The main control part 160 performs a picture image processing input from the unit circuit 140, a compression and expansion processing of picturesque data, an AF processing and a picturesque recognition process, etc. The main control part 160 includes an AF part 161 and a finger tracking AF part 163. The AF part 161 may focus a central part of an image or may focus a human face by recognizing a smiling aspect or face of a person. The finger tracking AF part 163 includes a finger area detecting part 163-1, a thinning part 164-3 and a selective AF part 163-5. The finger area detecting part 163-1 detects a fingered region from an image containing a finger, and black/white processes the fingered region detected from the image and a non-finger area.

A thinning part 163-3 thin-processes the detected fingered area, and a selective AF part 163-5 transmits a signal of focusing a certain area around the end part of a thinning line to a lens driving part 120.

A flash memory 170 may be a storage medium saving a picturesque data image-photographed by the image sensor 130.

Herein, the described "units 161, 163-1, 163-3, 163-5" is one example of being realized as each divided "unit", but any part of the described "units" may be implemented in divided several "units" and may be implemented as one unified "unit". For example, the finger region detecting part may also be realized as one unit unified with a thinning part 163-3.

A term 'unit' used in the present embodiment means software or a hardware component such as FPGA (field-programmable gate array) or ASIC, and 'unit' performs any mission. However, 'unit' is not limited to software or hardware. 'Unit' may be configured to exist in an addressable storage medium and also may be configured to execute one or more processors. Therefore, as one example, 'unit' includes constituents such as software components, object-oriented software components, class components and task components, processes, functions, attributes, procedures, subroutines, segments in a program code, drivers, a firmware, a microcode, a circuit, data, a database, data structures, tables, arrays, and variables. Components and a function provided in 'unit(s)' can be coupled to a smaller number of components and 'unit(s)' or more divided to further components and 'unit(s)'. In addition, components and 'unit(s)' may be implemented to execute one or more CPUs in a device or a secure multimedia card.

Described overall functions may be performed by processors such as a microprocessor, a controller, a microcontroller, ASIC (Application Specific Integrated Circuit) according to software or a program code coded to carry out the described function. The design, development and implementation would be obvious to those skilled in the art on the basis of the description of the present invention.

Figure 6:
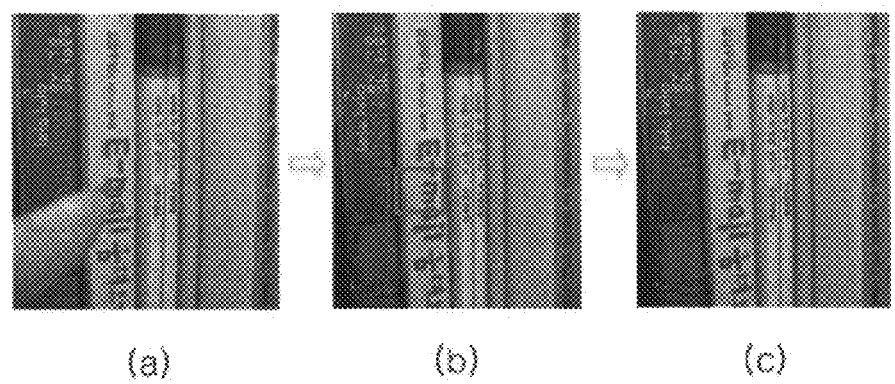
FIG. 6 is a diagram describing a photographing method using an auto focusing mode according to an embodiment of the invention.

FIG. 6 is a diagram describing a photographing method using an auto focusing mode according to an embodiment of the present invention.

Referring to FIG. 6, first, after one mode (for instance, a finger tracking AF mode) is selected from a camera module, a finger indicates a focusing desired portion in a preview pictorial image (a). Then, the camera module assigns a certain to-be-focused area around the end part of a finger line (b). After locking an AF function using a half-shutter, a user may remove a finger from the preview screen. Then, when a shutter is pressed down, a user assigned portion is brought to focus to capture an image (c).

Figure 7:
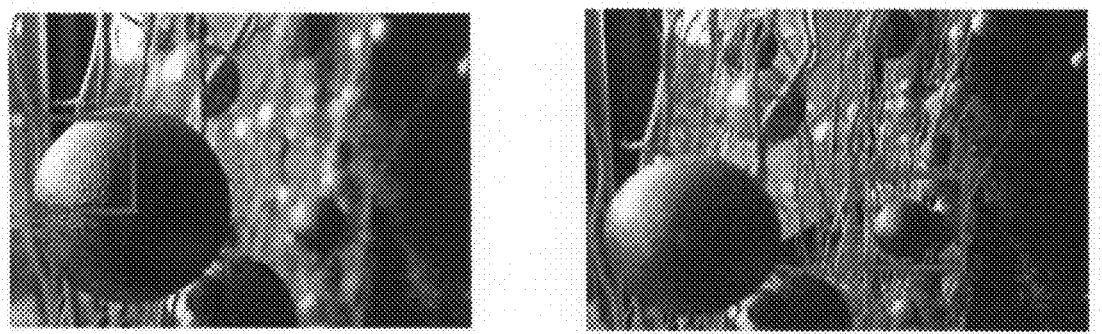
FIG. 7 is a photograph taken according to an auto focusing method according to an embodiment of the present invention.

FIG. 7 is a picture photographed using an auto focusing method according to an embodiment of the invention.

As shown in FIG. 7, a portable terminal having a camera module according to an embodiment of the present invention may focus on a user wanted portion to obtain a variety of pictures.

As shown in the foregone description, a camera module according to the invention sets a focusing area around the end part of a finger at the time of capturing an image when a user indicates a desired focusing setting area by a finger, so that the user can take the focus by freely selecting a desirable focus position at the time of photographing an image using a portable terminal having a camera module of the present invention. Also, it is possible to focus on a desired area with ease to photograph an image while holding a portable terminal in one hand without shifting the portable terminal.

While the present invention has been described in detail hereinabove through embodiments, those skilled in the art would understand that various modifications can be made in the present invention without departing from the spirit and scope of the present invention.

Therefore, the scope of the present invention should not be restricted to the described embodiment, but would encompass all embodiments that fall in the accompanying claims.

What is claimed is:

1. A method of adjusting a focus of a camera module in a photographing device, the method comprising:
    obtaining a preview image with a finger indicating an object to be focused by a user, the image being obtained by a lens part of the camera module;
    determining a finger area in the preview image based on skin-color information stored in the photographing device;
    performing a black-and-white process to the preview image, the finger area being processed as one color selected from black and white and the other area in the preview image being processed as the other color selected from black and white;
    determining a finger line by thinning a surface of the finger area to have a prescribed thickness;
    determining a fingertip of the finger area in the preview image, the fingertip being determined as an end of the finger line;
    determining a focus area to be focused based on the fingertip in the preview image;
    locking an auto focusing (AF) function when a shutter of the photographing device is half-pressed; and
    obtaining an image by focusing the focus area when the shutter of the photographing device is pressed.

2. The method of claim 1, wherein a center of the focus area includes the fingertip in the preview image.

3. The method of claim 1, wherein a size of the focus area corresponds to a quarter of the size of a display unit of the photographing device.

4. A photographing device, comprising:
    a display unit configured to display a preview image with a finger indicating an object to be focused by a user;
    a camera module including a lens part and configured to obtain the preview image;
    a memory configured to store skin-color information and temporarily store the preview image; and
    a controller configured to:
        determine a finger area in the preview image based on the skin-color information stored in the memory;
        perform a black-and-white process to the preview image, the finger area being processed as one color selected from black and white and the other area in the preview image being processed as the other color selected from black and white;
        determine a finger area line by thinning a surface of the finger area to have a prescribed thickness;
        determine a fingertip of the finger area in the preview image, the fingertip being determined as an end of the finger line;
        determine a focus area to be focused based on the fingertip in the preview image;
        lock an AF function when a shutter of the photographing device is half-pressed; and
        control the camera module to obtain an image by focusing the focus area when the shutter of the photographing device is pressed.

5. The device of claim 4, wherein a center of the focus area includes the fingertip in the preview image.

6. The device of claim 4, wherein the controller is further configured to determine a size of the focus area corresponding to a quarter of the size of the display unit.

* * * * *